United States Patent
Nagy et al.

(10) Patent No.: US 6,756,455 B2
(45) Date of Patent: Jun. 29, 2004

(54) HIGH-TEMPERATURE SOLUTION PROCESS FOR POLYOLEFIN MANUFACTURE

(75) Inventors: Sandor Nagy, Naperville, IL (US); Barbara M. Tsuie, West Chester, OH (US); William G. Todd, Victoria, TX (US); Charles S. Holland, Coal City, IL (US)

(73) Assignee: Equistar Chemicals, LP, Houston, TX (US)

( * ) Notice: Subject to any disclaimer, the term of this patent is extended or adjusted under 35 U.S.C. 154(b) by 27 days.

(21) Appl. No.: 10/160,797

(22) Filed: May 31, 2002

(65) Prior Publication Data

US 2003/0229188 A1 Dec. 11, 2003

(51) Int. Cl.[7] .................................................. C08F 4/44
(52) U.S. Cl. ........................ 526/161; 526/172; 526/160; 526/170; 526/134; 526/65; 526/348; 526/352
(58) Field of Search ................................ 526/160, 172, 526/170, 161, 65, 134

(56) References Cited

U.S. PATENT DOCUMENTS

| | | | |
|---|---|---|---|
| 5,153,157 A | 10/1992 | Hlatky et al. | 502/117 |
| 5,198,401 A | 3/1993 | Turner et al. | 502/155 |
| 5,241,025 A | 8/1993 | Hlatky et al. | 526/129 |
| 5,414,180 A | 5/1995 | Geerts et al. | 585/525 |
| 5,648,440 A | 7/1997 | Sugano et al. | 526/132 |
| 5,767,208 A | 6/1998 | Turner et al. | 526/160 |
| 6,207,774 B1 | 3/2001 | Hasegawa et al. | 526/160 |
| 6,232,260 B1 | 5/2001 | Nagy et al. | 502/155 |
| 6,291,609 B1 | 9/2001 | Crowther et al. | 526/127 |
| 6,313,240 B1 | 11/2001 | Hasegawa et al. | 526/133 |
| 6,376,629 B2 * | 4/2002 | Nagy et al. | 526/161 |

FOREIGN PATENT DOCUMENTS

WO  WO 99/24446  5/1999

OTHER PUBLICATIONS

Hasegawa, et al., *J. Polym. Sci., A* 38 (2000) 464.1.
Yano, et al., *J. Mol. Catal. A* 156 (2000) 133.
Buu–Hoi and Xuong, *J. Chem. Soc.* (1952) 2225.

* cited by examiner

*Primary Examiner*—David Wu
*Assistant Examiner*—Rip A. Lee
(74) *Attorney, Agent, or Firm*—Jonathan L. Schuchardt

(57) ABSTRACT

A high-temperature solution process for making polyolefins is disclosed. Olefins polymerize at greater than about 130° C. in the presence of an activator and an organometallic complex. The complex includes a bridged indenoindolyl ligand. One part of the ligand is a second indenoindolyl group or a polymerization-stable, cyclopentadienyl-like group having an extended pi-electron system. Because the catalysts activate quickly and thoroughly, even with low levels of an alumoxane, the invention provides an efficient way to make high-molecular-weight (Mw>100K) polyolefins.

18 Claims, No Drawings

HIGH-TEMPERATURE SOLUTION PROCESS FOR POLYOLEFIN MANUFACTURE

FIELD OF THE INVENTION

The invention relates to a process for making polyolefins. In particular, the invention is a high-temperature solution process for making olefin polymers, especially polyethylenes. The process is catalyzed by an indenoindolyl transition metal complex.

BACKGROUND OF THE INVENTION

High-temperature solution processes for olefin polymerization require a thermally robust catalyst. A few Ziegler-Natta catalysts based on titanium and vanadium components meet this test; some can withstand reactor temperatures as high as 250° C. or more. In a typical solution process, the temperature and pressure in the reactor exceed the critical points of the olefin reactants and any added solvent, and the reactor temperature exceeds the polymer melting point. Consequently, the reactor contents are always liquified or "in solution." Typical reactor pressures are 2000 to 5000 psig when a solvent is used. The polymerization can be performed in one or more stages. When polymerization is complete, the molten polymer must be treated to remove catalyst residues, which can cause color problems if not removed. Volatiles are stripped, and the product is cooled, pelletized, and dried.

Another type of solution process uses a stirred-zone reactor and no added solvent. In this process, the liquified olefin reactant, e.g., ethylene, functions as a solvent. These processes operate at relatively high temperatures (200 to 300° C.) and pressures (15,000 to 50,000 psig).

Solution processes are characterized by short residence times (normally less than 10 minutes, and often as little as a minute or two). Consequently, in addition to having temperature stability, the catalyst systems used in these processes must activate quickly and thoroughly. This contrasts sharply with the requirements for catalysts used in slurry and gas-phase processes, where residence times are longer and catalyst lifetime is more important. Thus, a catalyst that is valuable for slurry and gas-phase processes might be a poor choice for use in a high-temperature solution process, and vice-versa.

As noted earlier, the Ziegler-Natta catalysts commonly used in high-temperature solution polymerizations have some limitations, one of which is the need to remove catalyst residues to avoid color problems. A second limitation relates to polymer density. Because the Ziegler-Natta catalysts incorporate comonomers only to a degree under these conditions, it can be difficult to drive polymer densities much below about 0.93 g/cm$^3$. Consequently, it is challenging to make LLDPE, a product that is valuable for packaging film and other products, by using the high-temperature solution process with commonly available catalysts.

"Single-site" catalysts (including metallocenes), the new generation of olefin polymerization catalysts, may offer benefits for high-temperature processes. Some varieties incorporate comonomers well, and the catalysts can often be left in the polymer without adversely affecting color or other properties. Unfortunately, many single-site catalysts are not stable above 100° C., so activities increase with temperature only until the catalyst begins to degrade; then, activity drops—often dramatically. In addition, many catalysts lose the ability to make high-molecular-weight polymer at higher temperatures. These drawbacks have been partially overcome by using "bridged" ligands, which tend to make the organometallic complex more thermally robust. See, for example: Hasegawa et al., *J. Polym. Sci., A* 38 (2000) 4641; Yano et al., *J. Mol. Catal. A* 156 (2000) 133; and U.S. Pat. No. 6,207,774, wherein a borate-activated, diphenylmethylene-bridged zirconocene is used to make high-molecular-weight polymers at 150–200° C. Excellent activity was observed for the zirconium complex in which the diphenylmethylene group bridges cyclopentadienyl and fluorenyl ligands.

Bridging, however, does not provide a completely satisfactory solution for high-temperature solution polymerizations, in part because the complex must ordinarily be used with an activator. Alumoxanes, the most well-known activators, have limited thermal stability above 160° C., and their use in high-temperature processes has been discouraged. See, for example, U.S. Pat. No. 5,767,208, which teaches to use ionic borate activators rather than alumoxanes in a high-temperature solution process. Borate activators are also used in the high-temperature processes disclosed in U.S. Pat. Nos. 6,313,240, 6,291,609, and 6,207,774. The '774 patent identifies another problem of alumoxanes: the large amount of expensive alumoxane needed to give reasonable activity with most metallocenes (see column 1, lines 40–46). The '240 and '609 patents teach to use hafnium as the transition metal to produce a higher molecular weight product compared with that available from using a similar zirconium complex.

Organometallic complexes that incorporate "indenoindolyl" ligands are known. U.S. Pat. No. 6,232,260 teaches the use of indenoindolyl Group 3–10 metal complexes as catalysts for polymerizing olefins. The examples illustrate the use of a non-bridged bis(indenoindolyl)zirconium complex for making HDPE using a slurry process at 80° C. to 110° C. The '260 patent generally teaches that comonomers can be used and that the indenoindolyl ligand can be bridged to another ligand. The reference indicates that, in addition to the indenoindolyl ligand, another "polymerization-stable" ligand can be present. Cyclopentadienyl, indenyl, and fluorenyl are taught as equivalents for the polymerization-stable ligand (see column 3, lines 43–48). Versatility is an advantage of the complexes. By modifying the starting materials, a wide variety of indenoindolyl complexes can be prepared.

PCT Int. Appl. WO 99/24446 (Nifant'ev et al.) also teaches organometallic complexes that incorporate a Group 3–6 transition metal and an indenoindolyl ligand. In many of the complexes, the indenoindolyl group is bridged to another ligand, which is often a second indenoindolyl ligand. Nifant'ev uses the catalysts to make a variety of polyolefins, including HDPE, LLDPE, ethylene-propylene copolymers, and polypropylene. Nifant'ev teaches to use the catalysts with a high molar ratio of aluminum to transition metal, typically 1000–8000, for favorable activity. Nifant'ev uses unsupported complexes in a low-temperature process; all of the examples are performed at 30° C. to 80° C.

Neither Nifant'ev nor the '260 patent teaches solution processes, and neither indicates a preference for a particular indenoindolyl complex for use in a high-temperature solution polymerization. The references are also silent about the desirability of using a particular indenoindolyl complex for a solution process with a short residence time.

In sum, the industry would benefit from additional single-site alternatives to the Ziegler-Natta catalysts currently used in high-temperature solution processes for olefin polymerization. However, single-site catalysts with the ability to make high-molecular-weight polymer, even at high temperature, are a must. Ideally, the single-site catalyst used in the process would activate quickly and thoroughly to meet the requirement of short residence time. A valuable process would take advantage of the inherent flexibility of the indenoindolyl ligand framework, and could utilize readily available alumoxane activators at low levels.

SUMMARY OF THE INVENTION

The invention is a high-temperature solution process for making polyolefins. Olefins polymerize rapidly (residence time <10 minutes) in a reaction zone at a temperature greater than about 130° C. in the presence of an activator and an organometallic complex. The complex includes a Group 3–10 transition metal and a bridged indenoindolyl ligand. One part of the ligand is a second indenoindolyl group or a polymerization-stable, cyclopentadienyl-like group having an extended pi-electron system. We found that complexes based on a particular kind of bridged indenoindolyl ligand are valuable for high-temperature solution polymerizations. Because the catalysts activate quickly and thoroughly, even with low levels of an alumoxane, the invention provides an efficient way to make high-molecular-weight (Mw>100K) polyolefins.

DETAILED DESCRIPTION OF THE INVENTION

The invention is a high-temperature solution polymerization process for making polyolefins. Olefins suitable for use in the process have a polymerizable carbon-carbon double bond. Examples include ethylene, propylene, butenes, pentenes, hexenes, octenes, and the like, and mixtures thereof. Preferred olefins are ethylene and mixtures thereof with 1-olefins such as propylene, 1-butene, 1-hexene, and 1-octene. Dienes, e.g., 1,3-butadiene, isoprene, or norbornenes, can be included in small amounts (<10 wt. %) in the process.

The olefins polymerize in solution. By "in solution," we mean that the temperature and pressure in the reactor are high enough that the monomers and any reaction solvent are primarily in the liquid phase. The reactor temperature is kept above the melting point of the polyolefin product.

The polymerization is performed in at least one reaction zone at a temperature greater than 130° C. and a pressure greater than 200 psig. The reaction zone can be located in any suitable equipment, such as batch reactors, continuous stirred-tank reactors (CSTRs), tubular reactors, or any combination of these. The polymerization can be performed in multiple reaction zones that are connected in parallel, in series, or both. Preferably, the temperature in each reaction zone exceeds 150° C.; more preferably, the temperature exceeds 160° C. Most preferred is the range from about 170° C. to about 270° C. Reactor pressures are greater than about 200 psig, and more preferably greater than about 500 psig. When a solvent is included, the preferred pressure ranges from about 500 psig to about 5000 psig. When the olefin or olefin mixture functions as a solvent, the pressure preferably ranges from about 2000 psig to about 50,000 psig.

The catalyst system used for the process comprises an activator and an organometallic complex. The activator helps to ionize the organometallic complex and activate the catalyst. Suitable activators are well known in the art. Examples include alumoxanes (methyl alumoxane (MAO), PMAO, ethyl alumoxane, diisobutyl alumoxane), alkylaluminum compounds (triethylaluminum, diethyl aluminum chloride, trimethylaluminum, triisobutyl aluminum), and the like. Suitable activators include acid salts that contain non-nucleophilic anions. These compounds generally consist of bulky ligands attached to boron or aluminum. Examples include lithium tetrakis(pentafluorophenyl)borate, lithium tetrakis(pentafluorophenyl)aluminate, anilinium tetrakis (penta-fluorophenyl)borate, and the like. Suitable activators also include organoboranes, which include boron and one or more alkyl, aryl, or aralkyl groups. Suitable activators include substituted and unsubstituted trialkyl and triarylboranes such as tris(pentafluorophenyl)borane, triphenylborane, tri-n-octylborane, and the like. These and other suitable boron-containing activators are described in U.S. Pat. Nos. 5,153,157, 5,198,401, and 5,241,025, the teachings of which are incorporated herein by reference. Suitable activators also include aluminoboronates—reaction products of alkyl aluminum compounds and organoboronic acids—as described in U.S. Pat. Nos. 5,414,180 and 5,648,440, the teachings of which are incorporated herein by reference. Alumoxane activators, such as MAO, are preferred.

The optimum amount of activator needed relative to the amount of organometallic complex depends on many factors, including the nature of the complex and activator, the desired reaction rate, the kind of polyolefin product, the reaction conditions, and other factors. Generally, however, when the activator is an alumoxane or an alkyl aluminum compound, the amount used will be within the range of about 0.01 to about 5000 moles, preferably from about 10 to about 500 moles, and more preferably from about 10 to about 200 moles, of aluminum per mole of transition metal, M. When the activator is an organoborane or an ionic borate or aluminate, the amount used will be within the range of about 0.01 to about 5000 moles, preferably from about 0.1 to about 500 moles, of activator per mole of M. The activator can be combined with the complex and added to the reactor as a mixture, or the components can be added to the reactor separately.

The organometallic complex includes a Group 3 to 10 transition metal, M. As used herein, "transition metal" includes metals of the lanthanide and actinide series. More preferred complexes include a Group 4 to 6 transition metal; most preferably, the complex contains a Group 4 metal such as titanium or zirconium.

The organometallic complex includes a bridged indenoindolyl ligand of the general structure:

A-G-L in which A is an indenoindolyl group, G is a bridging group, and L is another indenoindolyl group or a polymerization-stable, cyclopentadienyl-like group having an extended pi-electron system. Both A and L are pi-bonded to the metal.

Indenoindolyl ligands are generated by deprotonating an indenoindole compound using a potent base. By "indenoindole compound," we mean an organic compound that has both indole and indene rings. The five-membered rings from each are fused, i.e., they share two carbon atoms. Preferably, the rings are fused such that the indole nitrogen and the only $sp^3$-hybridized carbon on the indenyl ring are "trans" to each other. Such is the case in an indeno[1,2-b] ring system such as:

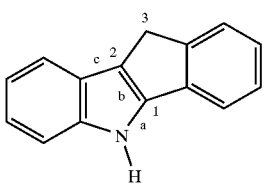

Suitable ring systems also include those in which the indole nitrogen and the sp$^3$-hybridized carbon of the indene are beta to each other, i.e., they are on the same side of the molecule. This is an indeno[2,1-b]indole ring system:

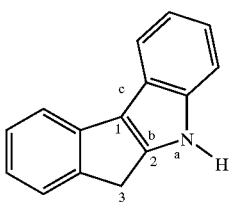

The ring atoms can be unsubstituted or substituted with one or more groups such as alkyl, aryl, aralkyl, halogen, silyl, nitro, dialkylamino, diarylamino, alkoxy, aryloxy, thioether, or the like. Additional fused rings can be present, as long as an indenoindole moiety is present.

Numbering of indenoindoles follows IUPAC Rule A-22. The molecule is oriented as shown below, and numbering is done clockwise beginning with the ring at the uppermost right of the structure in a manner effective to give the lowest possible number to the heteroatom. Thus, 5,10-dihydroindeno[1,2-b]indole is numbered as follows:

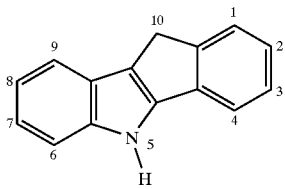

while 5,6-dihydroindeno[2,1-b]indole has the numbering:

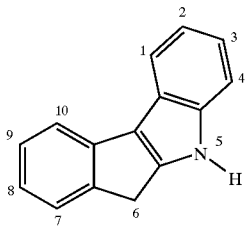

For correct nomenclature and numbering of these ring systems, see the *Ring Systems Handbook* (1998), a publication of Chemical Abstracts Service, Ring Systems File II: RF 33986-RF 66391 at RF 58952 and 58955. (Other examples of correct numbering appear in PCT Int. Appl. WO 99/24446.)

Methods for making indenoindole compounds are well known. Suitable methods and compounds are disclosed, for example, in U.S. Pat. No. 6,232,260, the teachings of which are incorporated herein by reference, and references cited therein, including the method of Buu-Hoi and Xuong, *J. Chem. Soc.* (1 952) 2225. Suitable procedures also appear in PCT Int. Appl. WO 99/24446.

The indenoindolyl group, A, is bridged to another anionic group, L, through a bridging group, G, and both A and L coordinate to the transition metal in the organometallic complex. L can be a second indenoindolyl group. L can also be a polymerization-stable, cyclopentadienyl-like group having an extended pi-electron system. By "cyclopentadienyl-like" or "Cp-like," we mean an anionic group capable of donating six pi electrons to a transition metal center. Cyclopentadienyl, boraaryl, and pyrrolyl are examples. By "extended pi-electron system," we mean that the Cp or Cp-like ring is fused to at least one additional coplanar aromatic ring, preferably a benzene ring. Thus, examples of suitable L groups are substituted and unsubstituted boraanthracenyl, boranaphthalenyl, fluorenyl, indenyl, indolyl, indenoindolyl, and the like, but not cyclopentadienyl, borabenzenyl, or pyrrolyl, which lack an "extended" pi-electron system.

A divalent bridging group, G, covalently connects the indenoindolyl group, A, and the L group. Suitable bridging groups are well known. Many are described in WO 99/24446. They include, for example, dialkylsilyl, diarylsilyl, ethylidene, isopropylidene, methylene, diphenylmethylene, dimethylene, 1,2-diphenylene, 1,4-diphenylene, and the like. Particularly preferred are methylene, dimethylene, isopropyl-idene, and dimethylsilyl.

In addition to the bridged indenoindolyl ligand, the organometallic complex usually includes one or more labile anionic ligands such as halides, alkoxys, aryloxys, alkyls, alkaryls, aryls, dialkylaminos, or the like. Particularly preferred are halides, alkyls, and alkaryls (e.g., chloride, methyl, benzyl).

Preferred organometallic complexes have the general structure:

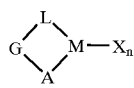

wherein L, G, and A are as defined above, M is a Group 3–10 transition metal, each X is independently a labile ligand (halide, alkyl, aryl, alkoxy, aryloxy, alkylamido, siloxy, or the like), and n is an integer that satisfies the valence of M. Preferably, M is a Group 4 transition metal, X is a halide, and L is selected from the group consisting of boraanthracenyl, boranaphthalenyl, fluorenyl, indenyl, indolyl, and indenoindolyl.

Some exemplary organometallic complexes suitable for use in the process of the invention:

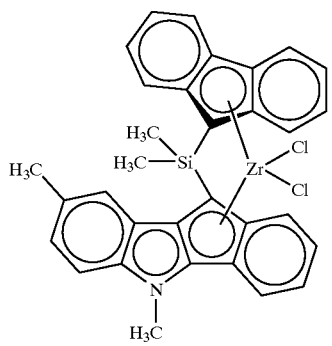

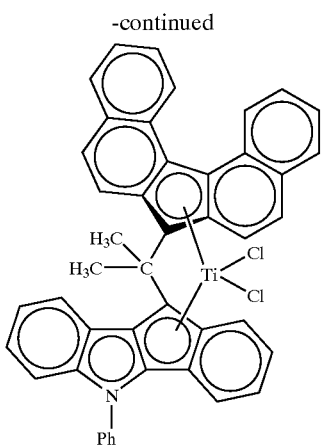

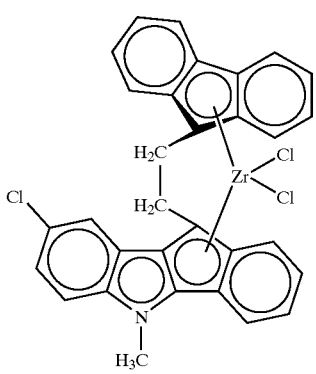

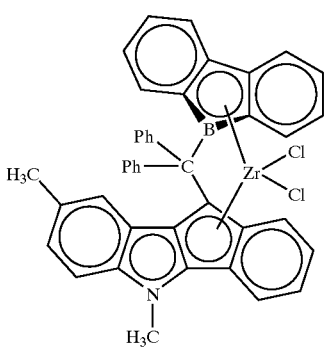

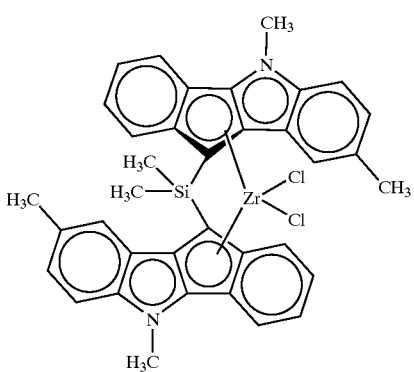

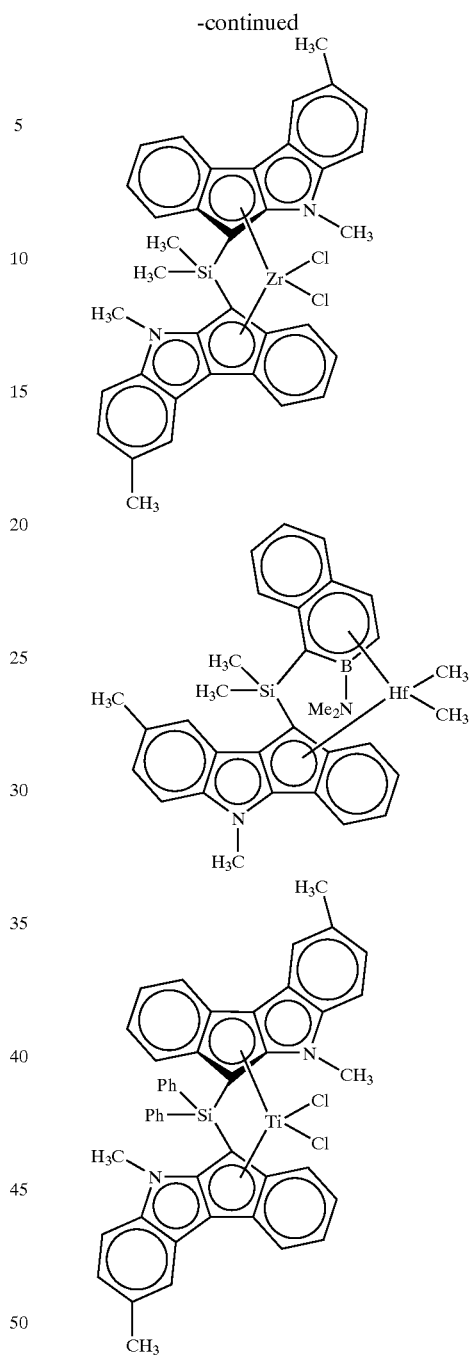

The bridged ligands are produced using well-known methods. In a typical synthesis, an indenoindole compound is first prepared and N-alkylated. Deprotonation and displacement reactions are used to attach a bridging group and the L group. The catalyst preparation examples below show a typical strategy. An indeno[1,2-b]indole is prepared by reacting 1-indanone and p-tolylhydrazine hydrochloride to give 1. N-methylation gives 2. Reaction with n-butyllithium generates an indenoindolyl monoanion (3). Separately, 9-chlorodimethylsilylfluorene (7) is prepared by reacting fluorenyllithium with dichlorodimethylsilane. Finally, the bridged ligand (8) is generated by reacting monoanion 3 with silyl halide 7.

To generate the complex, the bridged ligand is first deprotonated with at least two equivalents of a potent base such as lithium diisopropylamide, n-butyllithium, sodium hydride, a Grignard reagent, or the like. The resulting dianion reacts with a Group 3 to 10 transition metal source to produce the organometallic complex. Any convenient source of the Group 3 to 10 transition metal can be used. Usually, the source is a complex that contains one or more labile ligands that are easily displaced by the dianion. Examples are halides (e.g., $TiCl_4$, $ZrCl_4$), alkoxides, amides, and the like.

To prepare complex 10 below, the bridged ligand (8) is first reacted with two equivalents of n-butyllithium to generate a dianion (9). Addition of zirconium tetrachloride gives the desired complex, 10. A similar strategy is employed to generate other suitable bridged ligands and complexes. For additional suitable synthetic approaches to the bridged ligands and complexes, see WO 99/24446.

Catalyst systems used in the process of the invention activate rapidly. This is a requirement for the high-temperature solution process because the average residence time of the olefin in the reaction zone is less than 10 minutes, and preferably less than 5 minutes. With an active enough catalyst, the residence time may be less than one minute.

We surprisingly found that catalyst systems that incorporate certain bridged indenoindolyl ligands have the required stability and fast activation for a high-temperature solution process. In addition to the indenoindolyl group, the bridged ligand needs a cyclopentadienyl-like group having an extended pi-electron system. As Examples 3–4 below demonstrate, a bridged indenoindolyl-fluorenyl complex outperforms (activity higher by a factor of 5) a comparable indenoindolyl-cyclopentadienyl complex in a high-temperature olefin polymerization process having a short residence time.

Interestingly, a low level of an alumoxane activator can be used. This is surprising in view of earlier teachings that recommend using the more thermally stable borate activators in a high-temperature solution process. As Examples 3–4 show, MAO can be used at an exceptionally low level (molar ratio of Al:Zr=100) with good results.

The process of the invention gives polyolefins with high molecular weight. While high molecular weights can be difficult to maintain in high-temperature solution processes, we were able to make polyolefins with weight average molecular weights (Mw) greater than 100,000 (see Examples 3–4).

As those skilled in the art will appreciate, there are many ways to practice process of the invention. In one convenient process, ethylene and a comonomer (preferably 1-hexene or 1-octene) are polymerized in a two-stage, adiabatic polymerization at a pressure in the range of about 2000 to 5000 psig. Purified monomers are preheated and continuously fed to a first reaction zone (or two separate, parallel units) along with a hydrocarbon solvent (e.g., hexane) and the bridged indenoindolyl catalyst at an initial temperature of about 70° C. to about 100° C. Hydrogen is used as needed to regulate polymer molecular weight and melt index. As the polymerization proceeds, heat is generated, and the liquid mixture of polymer and unreacted monomers exits the first reaction zone at a temperature in the range of about 100° C. to about 150° C. The mixture enters a second reaction zone, along with more catalyst, if needed. Temperature continues to rise (to a maximum of about 200° C. to about 250° C.) as polymerization nears completion, and the product exits the second stage. If desired, the mixture is sent to a third high-temperature stage to achieve a higher monomer conversion. Total residence time of the olefins in the reaction zones is less than 10 minutes, and preferably less than 5 minutes.

The polymer is finished by any suitable means. In one convenient approach, volatiles are stripped by reducing the pressure (to less than about 100 psig), monomers are recovered and reused, and the molten polymer is extruded, water-cooled, and pelletized. The pellets are steam-stripped to remove organics, dried, and screened prior to storage.

Catalyst removal is usually not needed, especially if the bridged indenoindolyl catalyst is the only one employed. Both a Ziegler-Natta and the indenoindolyl catalyst can be used if desired, however. The use of multiple catalysts provides flexibility for making a variety of different polyolefin products.

The following examples merely illustrate the invention. Those skilled in the art will recognize many variations that are within the spirit of the invention and scope of the claims.

Preparation of Catalyst A

Preparation of a Dimethylsilyl-bridged Indeno[1,2-b]indolyl Fluorenyl Zirconium Complex (10)

(a) Preparation of Indeno[1,2-b]indole 1. A mixture of 1-indanone (30.6 g, 232 mmol) and p-tolylhydrazine hydrochloride (37.0 g, 233 mmol) in EtOH (350 mL) and aqueous HCl (12 N, 18 mL) are heated to reflux for 90 min. The mixture is cooled and filtered, and the solid is washed with EtOH (600 mL) followed by 20% aqueous EtOH (400 mL) and finally hexanes (200 mL). The off-white solid is dried under vacuum (36.5 g, 72%).

(b) N-Methylation of 1. A mixture of 1 (36.5 g, 166 mmol), aqueous NaOH solution (112 mL, 20 M, 2.2 mol), $C_{16}H_{33}NMe_3Br$ (0.65 g, 1.78 mmol), and toluene (112 mL) is vigorously stirred at room temperature. A solution of MeI (17.0 mL, 273 mmol) in toluene (15 mL) is added dropwise, and the mixture is stirred at room temperature for 4 h and refluxed for 3 h. A crystalline solid forms upon cooling and is filtered and washed with cold (−78° C.) EtOH (300 mL) followed by hexanes (100 mL). The layers are separated and the aqueous fraction is washed with toluene (2×100 mL). The organics are combined and dried over $Na_2SO_4$ and filtered. The volatiles are removed under vacuum and the precipitate is dried and combined with the crystalline product 2 (total yield 25.7 g, 66%).

(c) Anion generation: Preparation of 3. n-Butyllithium (120 mL, 2.5 M, 1.6 mol) is added dropwise to a solution of 2 (43.9 g, 188 mmol) in toluene (560 mL). A precipitate forms after an hour. The mixture is allowed to stand for 48 h and is filtered. The solid is washed with toluene (500 mL), then hexanes (500 mL), and is dried under vacuum (40.3 g, 90%).

(d) Preparation of 9-Chlorodimethylsilylfluorene (7). A slurry of fluorene (24.0 g, 144 mmol) in $Et_2O$ (400 mL) is cooled to 0° C., and n-BuLi (90.0 mL, 2.5 M in hexanes, 225 mmol) is added dropwise. The solution turns orange and warms to room temperature overnight. A solution of $SiCl_2Me_2$ (210 mL, 1.73 mol) in $Et_2O$ (100 mL) is cooled to 0° C., and the fluorenyl anion is added dropwise. A precipitate forms immediately, and the mixture is stirred for 24 h and filtered. Volatiles are removed under reduced pressure, and the residue is washed with hexanes (100 mL) and filtered. The white solid is collected and dried under vacuum. A second crop is isolated from the hexanes wash (combined yield: 28.7 g, 77%).

(e) Reaction with 3 to give 8. A solution of 3 (15.3 g, 64.2 mmol) in toluene (250 mL) and $Et_2O$ (100 mL) is added dropwise to a solution of 7 (16.6 g, 64.0 mmol) in $Et_2O$ (100 mL). The mixture is stirred for 48 h and is then washed with $H_2O$ (200 mL). The layers are separated, and the organics are dried over $Na_2SO_4$ and filtered. Volatiles are removed under vacuum, and the residue is washed with hexanes (100 mL) and dried (7.89 g, 27%).

(f) Preparation of Dianion 9. A solution of 8 (7.89 g, 17.3 mmol) in $Et_2O$ (130 mL) is cooled to −78° C., and n-BuLi (15.0 mL, 2.5 M, 37.5 mmol) is added. The mixture is warmed to room temperature and a bright yellow solid forms. The mixture is filtered after 24 h, and the solid is dried under vacuum (9.84 g, 99%).

(g) Preparation of Complex 10. Dianion 9 (3.19 g, 6.82 mmol) is added to a solution of $ZrCl_4$ (1.59 g, 6.82 mmol) in toluene (150 mL) and $Et_2O$ (30 mL). The mixture turns purple and is stirred for 48 h and filtered. The solid is washed with toluene (100 mL) and dried under vacuum (2.75 g, 66%). The complex has the proposed structure:

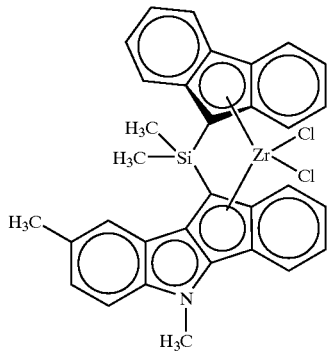

Preparation of Catalyst B (Comparative)

Preparation of a Dimethylsilyl-bridged Indeno[1,2-b]indolyl Cyclopentadienyl Zirconium Complex (6)

(a) Preparation of 4. A solution of 3 (23.3 g, 97.4 mmol) in toluene (240 mL) and $Et_2O$ (160 mL) is added to a solution of $SiCl_2Me_2$ (60.0 mL, 495 mmol) in $Et_2O$ (170 mL). The mixture becomes cloudy and is stirred for 48 h and filtered over Celite. Volatiles are removed under vacuum to afford a gray solid (24.8 g, 78%).

(b) Dianion generation. Preparation of 5. Sodium cyclopenta-dienide (16.0 mL, 2 M, 32.0 mmol) is added to a solution of 4 (9.62 g, 29.5 mmol) in $Et_2O$ (240 mL). A solid forms immediately, and the mixture is maintained at room temperature overnight. The crude mixture is washed with $H_2O$ (100 mL). The organic phase is dried over $Na_2SO_4$ and filtered. Evaporation to dryness gives an oil. The oil is dissolved in $Et_2O$ (250 mL) and cooled to −78° C. n-Butyllithium (28.0 mL, 2.5 M, 70.0 mmol) is added dropwise and the mixture warms slowly to room temperature. Stirring continues for 24 h. A yellow solid forms, the mixture is filtered, and the solid is dried under vacuum (12.3 g, 99%).

(c) Preparation of Zirconium Complex 6.

Dianion 5 (7.94 g, 21.6 mmol) is added as a solid to a solution of $ZrCl_4$ (5.03 g, 21.6 mmol) in toluene (250 mL) and $Et_2O$ (50 mL). The mixture turns orange and is maintained at room temperature for 48 h and then filtered. The solid is washed with toluene (200 mL), then hexanes (50 mL), and is dried under vacuum (4.0 g, 36%). The complex has the proposed structure:

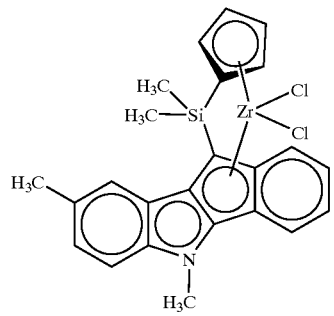

Preparation of Supported Complexes for Examples 1 and C2

Silica-Supported Catalyst A

Silica-Supported $Me_2Si$-bridged Indeno[1,2-b] indolyl Flu Complex

Methylalumoxane (0.5 mL of 4.21 M solution of MAO in toluene) is added to a 2.0-g sample of calcined silica (Davison 948 silica, calcined 4 h at 250° C.), and the mixture is stirred for 10 min. Zirconium complex 10 from Example 2 (20 mg) is dissolved in more of the MAO solution (0.90 mL), and this mixture is added to the pretreated silica, resulting in a green, free-flowing powder having an Al/Zr molar ratio of 200.

Silica-Supported Catalyst B

Silica-Supported $Me_2Si$-bridged Indeno[1,2-b] indolyl Cp Complex

Methylalumoxane (1.2 mL of 4.21 M solution of MAO in toluene, product of Albemarle) is added to a 4.0-g sample of the calcined silica, and the mixture is stirred for 10 min. Zirconium complex 6 from Example 1 (40 mg) is dissolved in more of the MAO solution (2.5 mL), and this mixture is added to the pretreated silica, resulting in a green, free-flowing powder having an Al/Zr molar ratio of 233.

EXAMPLE 1 AND COMPARATIVE EXAMPLE 2

Rate Profiles: Data from Slurry Polymerizations at 70° C.

A two-liter reactor is charged with isobutane (900 mL), 1-hexene (100 mL), and triisobutylaluminum (1.0 mL of 1 M solution in hexanes, 1.0 mmol). The reactor is heated to 70° C. and pressurized with ethylene to 350 psig. The silica-supported catalyst (0.36 g of "A" or 0.18 g of "B") is injected into the reactor to start the polymerization. Ethylene is supplied on demand at 350 psig, and the reaction proceeds at 70° C. for 30 minutes. Ethylene conversion is monitored as a function of time. Rate profile results for the first 10 minutes appear in Table 1.

TABLE 1

Rate Profiles: Slurry Polymerization at 70° C.

| | | Grams of ethylene converted per minute at: | | | | | |
|---|---|---|---|---|---|---|---|
| Ex # | Catalyst | 0 min | 2 min | 4 min | 6 min | 8 min | 10 min |
| 1 | A | 0 | 15 | 6 | 4 | 2 | 2 |
| C2 | B | 0 | 0 | 4 | 4 | 3 | 3 |

A = silica-supported Me$_2$Si-bridged indeno[1,2-b]indolyl(fluorenyl)ZrCl$_2$ complex
B = silica-supported Me$_2$Si-bridged indeno[1,2-b]indolyl(cyclopentadienyl)ZrCl$_2$ complex As the results in Table 1 demonstrate, the supported fluorenyl complex (A) activates much more rapidly, and loses activity more quickly, compared with the supported cyclopentadienyl complex (B). These results suggest that the fluorenyl complex is particularly well-suited for use in a high-temperature process in which the residence time is very short. In such a process, rapid activation of the catalyst is paramount.

EXAMPLES 3 AND 4 AND COMPARATIVE EXAMPLE 5

High-Temperature Solution Polymerizations

A two-liter, stainless-steel reactor, equipped as described above, is charged with hexane (700 mL) and 1-hexene (0 or 7.35 wt. %). The reactor is heated to 180° C. and pressurized with ethylene to 600 psig. A sample of the unsupported zirconium complex 6 ("Catalyst A") or 10 ("Catalyst B"), 2.0 or 4.0 mg, is dissolved in MAO/toluene solution (Al:Zr molar ratio=100), and this solution is injected into the reactor to start the polymerization. Ethylene is supplied on demand at 600 psig, and the reaction proceeds at 180° C. for 5 minutes. The reactor is vented, and the activity is determined from the amount of polyethylene produced. Catalyst activities and polymer properties are summarized in Table 2.

TABLE 2

Solution Polymerization at 180° C.

| Ex # | Catalyst | Amt. (mg) | Hexene (wt. %) | PE (g) | Activity (g/g Zr/ 5 min) | Mw | Mw/Mn | Tm (° C.), Density (g/cm$^3$) |
|---|---|---|---|---|---|---|---|---|
| 3 | A | 2.0 | 0 | 3.22 | 10,630 | 180 K | 5.38 | 133.6 (0.96) |
| 4 | A | 2.0 | 7.35 | 3.56 | 11,750 | 171 K | 6.83 | 126.8 (0.937) |
| C5 | B | 4.0 | 7.35 | 1.71 | 2,350 | 184 K | 3.90 | 123.2 (0.932) |

Polymerizations in hexane (700 mL) at 180° C.; 600 psig C2 (6 wt. %); MAO used at Al:Zr molar ratio of 100; reaction time = 5 min. Densities are estimated from Tm results.
A = unsupported Me$_2$Si-bridged indeno[1,2-b]indolyl(fluorenyl)ZrCl$_2$ complex
B = unsupported Me$_2$Si-bridged indeno[1,2-b]indolyl(cyclopentadienyl)ZrCl$_2$ complex The results demonstrate the benefits of the bridged indenoindolyl-fluorenyl complex for a high-temperature olefin polymerization process having a short residence time. Surprisingly, a low level of MAO can be used as an activator.

The preceding examples are meant only as illustrations. The following claims define the invention.

We claim:

1. A process which comprises polymerizing one or more olefins in solution in a reaction zone in a multi-stage reactor under adiabatic conditions at a temperature greater than 130° C. and a pressure greater than 200 psig in the presence of a catalyst system comprising: (a) an activator; and (b) an organometallic complex which comprises a Group 3–10 transition metal and a bridged indenoindolyl ligand of the general structure:

A-G-L in which A is an indenoindolyl group, G is a bridging group, and L is another indenoindolyl group or a polymerization-stable, cyclopentadienyl-like group having an extended pi-electron system, wherein both A and L are pi-bonded to the metal; and wherein the average residence time of the olefin in the reaction zone is less than 10 minutes.

2. The process of claim 1 wherein the temperature is greater than 160° C.

3. The process of claim 1 wherein the pressure is greater than 500 psig.

4. The process of claim 1 wherein the activator is selected from the group consisting of alumoxanes, ionic borates, ionic aluminates, alkylaluminum compounds, organoboranes, and aluminoboronates.

5. The process of claim 1 wherein the activator is methylalumoxane, and the catalyst system has an aluminum:transition metal [Al:M] mole ratio less than 200.

6. The process of claim 1 wherein L is selected from the group consisting of boranaphthalenyl, boraanthracenyl, fluorenyl, indenyl, indolyl, and indenoindolyl.

7. The process of claim 1 wherein G is selected from the group consisting of methylene, dimethylene, dimethylsilyl, diphenylmethyl, alkylboranyl, arylboranyl, and isopropylidene.

8. The process of claim 1 wherein the organometallic complex has the general structure:

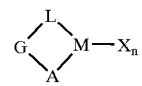

wherein M is the Group 3–10 transition metal; each X is independently selected from the group consisting of halide, alkyl, aryl, alkoxy, aryloxy, and siloxy; and n is an integer that satisfies the valence of M.

9. The process of claim 8 wherein the complex incorporates a Group 4 transition metal.

10. The process of claim 1 wherein the average residence time is less than 5 minutes.

11. The process of claim 1 in which a Ziegler-Natta catalyst is also used.

12. A process which comprises polymerizing ethylene, and optionally one or more 1-olefins, in solution in a reaction zone in a multi-stage reactor under adiabatic conditions at a temperature greater than 160° C. and a pressure greater than 500 psig in the presence of a catalyst system comprising: (a) an alumoxane activator; and (b) an organometallic complex which comprises a Group 4 transition metal and a bridged indenoindolyl ligand of the general structure:

A-G-L in which A is an indenoindolyl group, G is a bridging group, and L is another indenoindolyl group or a polymerization-stable, cyclopentadienyl-like group having an extended pi-electron system, wherein both A and L are pi-bonded to the metal; and wherein the average residence time of the olefin in the reaction zone is less than 10 minutes.

13. The process of claim 12 wherein the activator is methyl-alumoxane, and the catalyst system has an aluminum:transition metal [Al:M] mole ratio less than 200.

14. The process of claim 12 wherein L is fluorenyl.

15. The process of claim 12 wherein G is dimethylsilyl.

16. The process of claim 12 wherein the organometallic complex has the general structure:

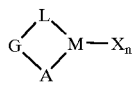

wherein M is the Group 4 transition metal; each X is independently selected from the group consisting of halide, alkyl, aryl, alkoxy, aryloxy, alkylamido. and siloxy; and n is an integer that satisfies the valence of M.

17. The process of claim 16 wherein the complex has the structure:

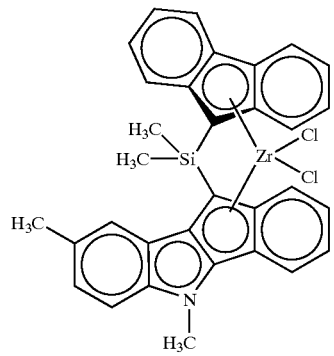

and wherein the activator is methylalumoxane, and the catalyst system has an aluminum:zirconium mole ratio less than 200.

18. The process of claim 12 wherein the average residence time is less than 5 minutes.

* * * * *